United States Patent [19]

Amateau et al.

[11] Patent Number: 4,508,158

[45] Date of Patent: Apr. 2, 1985

[54] GRAPHITE-METAL MATRIX BEARINGS AND METHODS OF MANUFACTURING

[75] Inventors: Maurice F. Amateau, Hinsdale; Keith R. Karasek, Villa Park, both of Ill.

[73] Assignee: International Harvester Company, Chicago, Ill.

[21] Appl. No.: 468,532

[22] Filed: Feb. 22, 1983

[51] Int. Cl.³ .............................................. B22D 19/02
[52] U.S. Cl. ...................................... 164/110; 164/97
[58] Field of Search .................. 164/97, 108, 109, 110

[56] References Cited

U.S. PATENT DOCUMENTS

| | | | |
|---|---|---|---|
| 3,103,722 | 9/1963 | Whitehurst et al. | 164/97 X |
| 3,608,170 | 9/1971 | Larson et al. | 164/97 X |
| 4,305,449 | 12/1981 | Loszewski et al. | 164/97 X |
| 4,318,438 | 3/1982 | Ban et al. | 164/97 |

Primary Examiner—Kuang Y. Lin
Attorney, Agent, or Firm—Ernest E. Helms; F. David Aubuchon

[57] ABSTRACT

Methods are disclosed for manufacturing graphite fiber metal matrix bearing materials using liquid metal pressure infiltration to achieve a high degree of intimate wetting, contact and infiltration of a compliant metal between and around graphite (carbon) fibers to provide graphite fiber metal matrix bearing material having a predetermined volume percentage of graphite fibers. In one embodiment, graphite fibers are wrapped around a removable cylindrical mandrel and the graphite fiber-wrapped mandrel is inserted into a mold and the mold which contains a liquid compliant metal, such as lead, to cause intimate wetting, contact and infiltration of the compliant metal between and around all of the graphite fibers. In another embodiment, graphite fibers in the form of a woven or non-woven mat are coated with a compliant metal, for example by submersing the mat in a molten bath of the compliant metal, to form a conformable graphite fiber metal foil, and a plurality of the foils are inserted in stacked relation, one above the other, onto a backing member disposed in a pressure mold. The pressure mold is filled with suitable graphite fiber compliant metal foils which are heated to a temperature above the solidus of the matrix metal and molded to the backing member causing a high degree of intimate wetting, contact and infiltration of the molten metal between the backing and among the foils.

8 Claims, 13 Drawing Figures

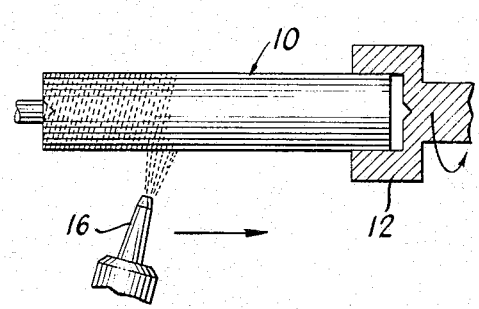
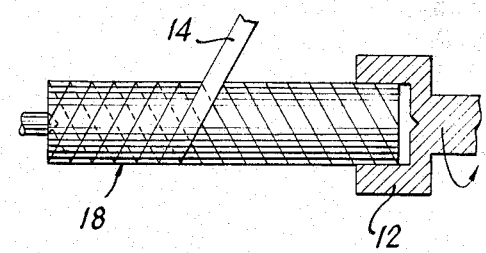
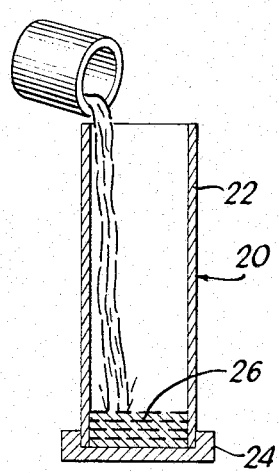
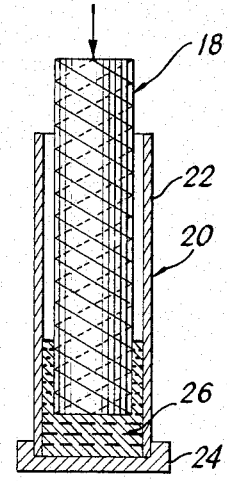
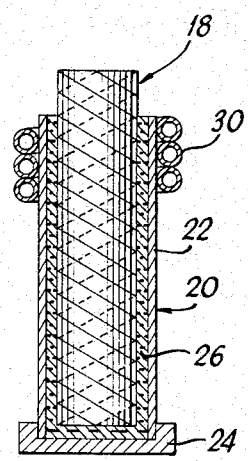
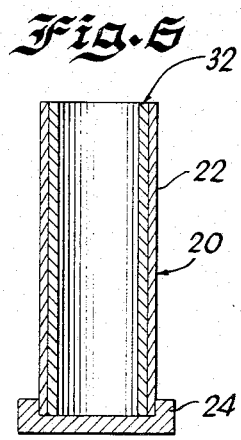
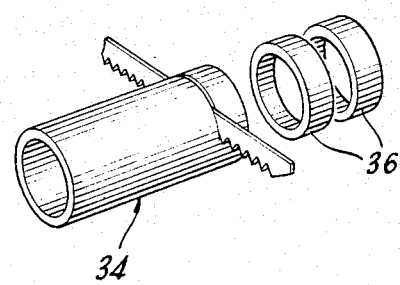

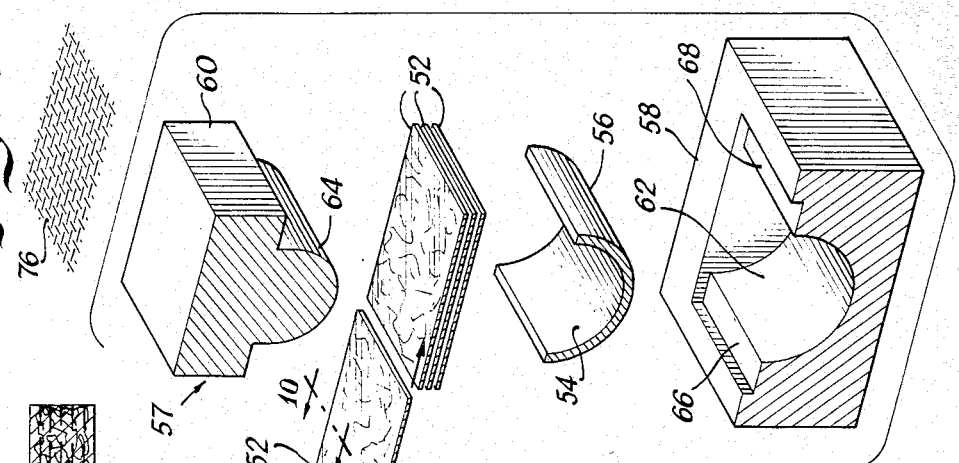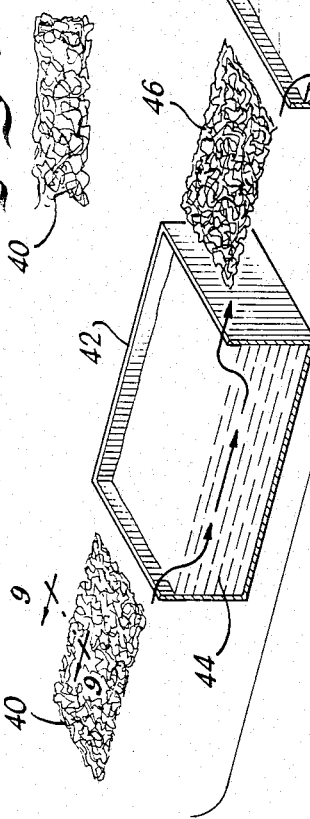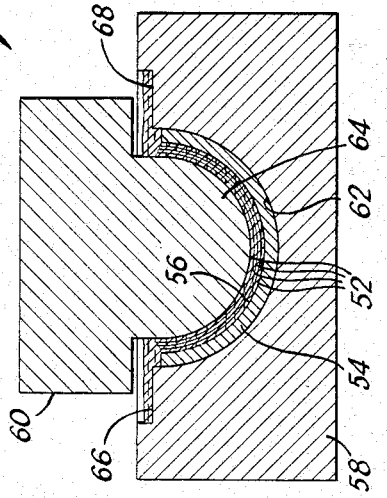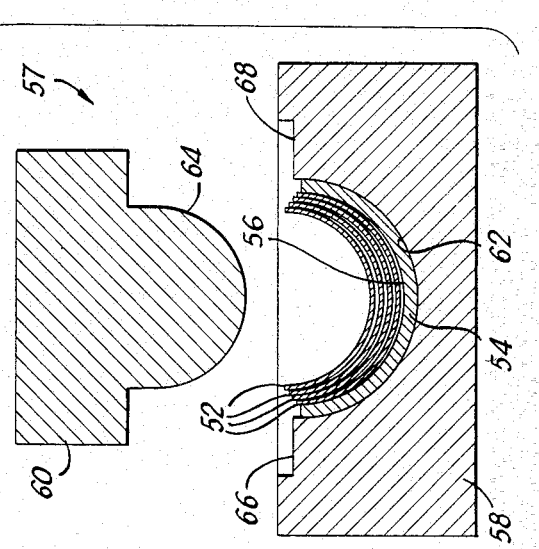

GRAPHITE-METAL MATRIX BEARINGS AND METHODS OF MANUFACTURING

FIELD OF THE INVENTION

The present invention is directed to graphite fiber metal matrix materials and methods of manufacturing graphite fiber metal matrix materials and, more particularly, to graphite fiber metal matrix bearings and bearing linings and methods of manufacturing the bearings and bearing linings.

BACKGROUND OF THE INVENTION

The life and load carrying capability of journal bearings is limited by the properties of the materials used in their construction. Hydrodynamic bearings include a strong steel backing member lined on their bearing surfaces with a compliant layer of metal, typically constructed of tin and lead-tin alloys. Such bearings are commonly called bi-metal bearings indicating a metal backing having a compliant metal bearing surface lining. The compliant metal layer can accomodate wear debris accumulated in the lubricating oil but does not have sufficient fatigue strength and tensile strength to support large mechanical loads. The greater the thickness of this compliant layer, the more tolerant the bearing is to wear debris and other foreign particles in the lubricating oil. However, the load carrying capacity of these bearings decreases as the compliant layer thickness increases. As a result, bearing designs have been a com-promise between the capability to accomodate wear debris and the ability to support loads and resist mechanical degradation such as fatigue.

A wide variety of compliant metal layers have been developed in an attempt to reach an effective compromise between wear debris accomodation and strength while also maintaining good temperature resistance, corrosion resistance, and resistance to scoring, while being conformable to shaft distortion and bending. For example, copper-lead and aluminum-tin compliant metals were developed to provide a harder, stronger lining material while attempting to provide sufficient compatability to accomodate wear debris, but such metal layers were found to suffer from relatively poor seizure and score resistance. Tri-metal construction then was developed by applying an overlay of metal on the bi-metal lining, such as by sintering a metal powder lining onto a steel strip or backing member and overlaying approximately 1 mil final metal layer, generally a lead-tin or lead-tin-copper alloy, such as by electroplating to increase fatigue resistance. The tri-metal bearing surfaces provide much higher load-carrying capacity for heavy duty bearings, but do not have as good embedability, capacity to accomodate wear debris, as the more compliant bi-metal bearing surfaces. Further, the tri-metal bearings are of much higher cost than the bi-metals.

Others have attempted to manufacture bearing materials having both strength and wear debris embedability by incorporating the strength characteristics of graphite fibers into soft metal linings to provide a bearing material comprising a metal matrix incorporating graphite (carbon) fibers. Such carbon fiber bearing materials have been manufactured generally in accordance with two known methods, illustrated by the Giltrow et al. U.S. Pat. No. 3,623,981 and the Old et al. U.S. Pat. No. 3,938,579. In accordance with the Giltrow et al. method, the carbon fibers are chopped and metal coated or mixed with powdered metal, to obtain a desired ratio of metal to carbon fiber, and the carbon fibers and metal are pressed into a desired shape to form a bearing having uniformly dispersed, randomly oriented carbon fibers.

The Old et al. method coats the carbon fibers with a metal coating, such as copper or nickel, so the fibers are wettable by the bearing metal, and the metal coated carbon fibers are directed into a trough in the form of a continuous strip. Molten bearing metal is poured into the trough at a temperature sufficiently high to wet the carbon fibers and thereafter the metal-carbon fiber matrix is cooled to solidify the metal-carbon fiber matrix bearing materials.

Graphite-metal matrix bearings manufactured in accordance with the Giltrow et al. and Old et al. methods have not achieved widespread commercial acceptance as a result of a number of problems associated with the processes. In accordance with these prior art processes, there is an insufficient degree of intimate contact, wetting and infiltration of compliant metal between and around the carbon fibers resulting in bearing materials which may include pockets of loosely held carbon fibers, at least on a microscopic scale, and also resulting in insufficient compliant metal infiltrating between the carbon fibers and the backing member to provide sufficient bonding between the bearing lining and the backing member. This insufficient bonding between lining and backing members sometimes results in delamination between the lining and the backing. Another disadvantage of the prior art Giltrow et al. and Old et al. methods is that these methods do not precisely control the fiber placement, the fiber orientation, or the fiber volume fraction in the graphite-metal matrix. All of these disadvantages are overcome in accordance with the principles of the present invention.

SUMMARY OF THE INVENTION

In brief, the present invention is directed to a method of manufacturing graphite fiber metal matrix bearing materials using liquid metal pressure infiltration to achieve a high degree of intimate wetting, contact and pressure infiltration of a compliant metal between and around graphite (carbon) fibers to provide a graphite-metal matrix bearing material having a predetermined volume of graphite fibers. In accordance with one important embodiment of the present invention, graphite fibers are wrapped around a removable cylindrical mandrel. The mold then is filled with a liquid compliant metal and the graphite fiber wrapped mandrel is inserted therein. The mandrel maintains a seal at the top of the mold resulting in a mold pressure of at least 50 psig thus causing intimate wetting, contact and infiltration of the compliant metal between and around all of the graphite fibers to achieve new and unexpected structural integrity in the graphite-metal matrix upon solidification. The mandrel is withdrawn from the mold leaving a cylindrically shaped bearing having a graphite-reinforced inner layer.

In accordance with another important embodiment of the present invention, wettable graphite fibers in the form of a woven or non-woven mat are coated with a compliant metal such as lead or lead-tin alloy, for example by submersing the mat in a molten bath of the compliant metal, to form a conformable graphite-metal foil layer upon solidification of the compliant metal. A plurality of the foils are inserted in stacked relation, one above the other, onto a backing member disposed in a suitable pressure mold. The male and female portions of the mold, heated to a temperature above the solidus of the compliant metal, are pressed together at a pressure of at least 50 psig forcing the metal foils to comply to the shape of the backing member and to cause a high degree of intimate wetting, contact and infiltration of the molten metal between and around the graphite fibers to achieve new and unexpected structural integrity and adherence of the resulting graphite-fiber metal matrix to the backing member.

Accordingly, an object of the present invention is to provide a new and improved method of manufacturing a graphite fiber metal matrix material.

Another object of the present invention is to provide a new and improved method of manufacturing graphite fiber metal matrix bearings and bearing lining material by contacting graphite fibers with a molten compliant metal and using above atmosphere pressure to force the molten metal between and around the graphite fibers.

Another object of the present invention is to provide a new and improved method of manufacturing a graphite fiber metal matrix bearing material by first forming a plurality of graphite fiber metal foil layers, disposing a plurality of the graphite fiber metal foil layers in stacked relation within a mold. Partially melting the compliant metal contained in the stacked foil layers forcing the molten portion of the compliant metal, under pressure, between and around the graphite fibers to bond the pluralities of graphite fiber metal matrix foils and expel excess matrix metal, and solidifying the matrix within the mold.

Still another object of the present invention is to provide a new and improved method of manufacturing graphite fiber metal matrix bearing and bearing lining materials by coating a removable mandrel with graphite fibers, in fiber or strip form, inserting the graphite fiber wrapped mandrel into a pressure mold filled with molten compliant metal to force the molten metal between and around the wrapped graphite fibers, solidifying the molten metal, and removing the mandrel to provide a graphite-metal matrix bearing or bearing lining material.

DESCRIPTION OF THE DRAWINGS

These and other objects and advantages of the present invention will become apparent from the drawings, in which:

FIG. 1 illustrates pre-coating a mandrel with a metal coating prior to graphite fiber wrapping;

FIG. 2 illustrates the step of wrapping graphite fibers on the mandrel;

FIG. 3 illustrates pouring molten metal into a cylindrical mold;

FIG. 4 illustrates pressing the fiber wrapped mandrel into the cylindrical mold to force the molten metal between the wall of the mold and the mandrel;

FIG. 5 illustrates the step of cooling the upper end of the mold to solidify the metal at the outer end and thereby form a seal;

FIG. 6 illustrates the resulting graphite-reinforced bearing after the mandrel is withdrawn;

FIG. 7 illustrates the step of cutting the graphite-reinforced bearing into a plurality of sleeve bearings of desired widths.

FIG. 8 is a perspective, schematic view of the sequence of operations in forming a graphite-metal foil, and a graphite-metal matrix bearing material from a plurality of the foils molded to a backing member;

FIG. 9 is a cross-sectional view, taken along line 9—9 of FIG. 8, showing a non-woven graphite mat used to form a graphite-metal foil;

FIG. 10 is a cross-sectional view, taken along line 10—10 of FIG. 8, showing the graphite metal foil;

FIG. 11 is a cross-sectional view of a mold used to manufacture the graphite-metal matrix bearing material prior to molding;

FIG. 12 is a cross-sectional view of a mold used to manufacture graphite fiber metal matrix bearings including a plurality of graphite-metal foils during partial melting and molding; and FIG. 13 is a perspective view of a woven graphite fiber mat useful in making graphite-metal foils.

DESCRIPTION OF THE PREFERRED EMBODIMENTS

Turning now to the drawings and initially to the first embodiment shown in FIGS. 1-7, there is illustrated a pictorial sequence of operations used to manufacture graphite fiber metal matrix bearing materials and bearing lining materials by wrapping graphite fibers onto a removable mandrel and inserting the mandrel into a pressure mold filled with molten compliant metal.

In accordance with the present invention, it has been discovered that precise control of fiber orientation, fiber fraction and fiber placement is possible by pre-wrapping the fiber pattern on a mandrel by filament winding. Such a winding operation can be performed on the device illustrated in FIG. 1 having a mandrel 10 which is axially rotated by winding chuck 12. The outside diameter of mandrel 10 is precisely equal to the inside diameter of the finished bearing. Prior to the fiber winding operation, it is preferred to precoat the mandrel surface with a metal release coating, such as colloidal graphite powder, as shown in FIG. 1, to promote mandrel withdrawal and fiber wetting.

To stabilize the carbon fiber wrapping 14 (FIG. 2) and preserve it during the subsequent squeeze casting operation, the fiber wrapped mandrel 10 is overcoated by metal spraying gun 16 with a metal which is compatible with the casting alloy. Alternatively, the overcoating can be accomplished by electrochemical plating. Fiber wrapping can be performed with either uncoated or precoated graphite fibers. A typical precoated graphite fiber includes a nickel coating, as disclosed in Giltrow et al. U.S. Pat. No. 3,623,981. In the embodiment illustrated in FIG. 2 a first layer of graphite fiber is wound on the mandrel at a predetermined angle with respect to the longitudinal axis of the mandrel. A second overlapping layer of graphite fiber is wrapped at a different angle with respect to the longitudinal axis of the mandrel.

After the fiber wrapping operation is completed, the mandrel 10 is removed from the winding chuck 12. The mandrel is used as a plunger during the casting process, as will be described below. Referring to FIG. 5, there is shown a cylindrical open ended mold 20. The cylindrical mold 20 is formed by a steel tube 22 having an end cup 24 which has a flat bottom surface for standing the mold 20 in an upright position. The metal cylindrical tube 22 has an outside diameter equal to the desired bearing diameter. The difference between the inside diameter of the tube 22 and the outside diameter of the mandrel 10 defines the thickness of the reinforced bearing metal layer to be formed.

By placing end cup 24 on the lower end of steel tube 22 in a sealed relationship, there is formed a mold for receiving the molten bearing alloy. The molten alloy 26 is poured into the receptacle, as illustrated in FIG. 3 and the fiber wrapped mandrel 18 then is inserted into the open end of the tube 22, in a coaxial relationship, to displace the molten metal alloy 26 upwardly, as illustrated in FIG. 4.

Referring to FIG. 5, the upper end of cylindrical mold 20 is fitted with a cooling coil 30. The cooling of the upper end causes solidification to begin in the cylindrical upper end portion of the molten metal 26 causing a seal to be formed prior to the complete solidification of the bearing layer. The mandrel 10 is continuously forced downwardly into mold 20 after the seal has been formed to create hydrostatic pressure on the remaining liquid portion of the molten metal. Solidification continues to proceed in a downward direction from the upper end portion. This hydrostatic pressure maintained during solidification aids in the infiltration of the molten metal to enhance the complete wetting of the fibers.

Once solidification is complete, the mandrel is pulled from steel tube 22 leaving the graphite fibers embedded in the solidified molten metal layer 32, typically the graphite fiber comprises 10 to 70 percent of the weight of the graphite fiber metal matrix. The resulting graphite fiber metal matrix bearing material 34 is a metal tube 22 having the graphite reinforced bearing metal layer 32 on its internal surface. The graphite fiber metal matrix bearing material 34 can then be sliced transverse to the longitudinal axis of the tubular mold into a plurality of sleeve bearings 36 of desired width, as illustrated in FIG. 7.

Turning now to FIGS. 8-13, in accordance with another important embodiment of the present invention, graphite-metal matrix bearing materials and linings can be manufactured using arrays of graphite fibers, such as woven and non-woven graphite fiber mats. The graphite fiber mats are coated with a suitable molten compliant metal to form a graphite-metal foil, and a stacked array of the graphite-metal foils are disposed against an inner surface of a suitably shaped bearing backing member. The backing member and foils then are inserted into a mold cavity of a pressure mold which has been heated to a temperature high enough to partially melt the compliant metal of the composite foils. The top part of the mold is brought down squeezing out excess liquid metal and causing the foils to bond to the backing material.

Turning now to FIG. 8, a non-woven nickel coated graphite mat 40, made up of a plurality of graphite fibers, is dipped in fluxing tank 42 with a flux 44, such as dilute hydrocholoric acid or any of a number of commercially available fluxes capable of rendering the nickel coated graphite fibers wettable by a bearing metal, to form a fluxed, nickel plated graphite mat 46. The plating of graphite fibers to render them wettable by a bearing metal is well known in the art, as described in the Morin et al. U.S. Pat. No. 3,623,981. The fluxed, nickel coated graphite mat 46 then is submersed in a bath of molten bearing metal 48 in molten metal reservoir 50.

The molten bearing metal 48 adheres to the plated carbon fibers of the graphite mat 46 in molten metal reservoir 50 and creates a film between adjacent graphite fibers so that when the mat is removed from the reservoir 50 and cooled, a graphite-fiber metal foil 52 is formed including a random array of metal plated graphite fibers having a solid coating of bearing metal and a film of solid bearing metal between adjacent carbon fibers. The bearing metal coating and film portion of the foil 52 is important for the purpose of embedding the graphite fibers into a bonded, handleable form capable of maintaining a predetermined position within a mold cavity filled with molten metal. Without the metal coating and film around the graphite fibers, the fibers would float in molten metal within a mold and it would be impossible to position the fibers in a predetermined position, orientation, or volume fraction. The bearing metal coating the graphite fibers and forming a film between adjacent fibers will melt within the mold when the foils 52 are submersed in molten metal, and, therefore, there is no criticality with respect to the fraction of metal in the foil 52 or the metal distribution over the dimensions of the foil. Often, a trailing edge of the graphite mat 46 will pick up more bearing metal as the mat 46 is removed from the molten metal reservoir 50 due to cooling of the foil as it is being removed. Consequently, the foils 52 may not be of a consistent thickness. A plurality of these foils 52 then are stacked upon an inner surface 54 of a bearing backing member 56 formed in a half-cylinder configuration and the backing member 56, having a stack of foils 52 above this inner surface 54, are disposed within a mold, designated generally by reference numeral 57.

The mold 57 includes a female mold portion 58 and a male mold portion 60 for pressure bonding of the partially graphite fiber metal to one another and to secure the foils to the inner surface 54 of the backing member 56, as shown in FIGS. 11 and 12. The female mold portion 58 includes an inner surface 62 shaped to conform to an outer surface of the backing member 56 to provide a bearing half having an outside diameter equal to the diameter of female mold surface 62. The male mold portion 60 includes a half-cylindrical male mold surface 64 defining the internal bearing surface diameter of the half bearing manufactured in the mold.

In accordance with an important feature of this embodiment of the present invention, stepped surfaces 66 and 68 are provided on each side of the female mold surface 62 to maintain clearance between the female mold half 58 and male mold portion 60 at all times during molding, as shown in FIG. 12. Excess molten metal can be squeezed out of the mold cavity while the female mold porton 58 and male mold portion 60 are squeezed together, as shown in FIG. 12, to provide an unusually high graphite content in the molded graphite-metal matrix bearing material, i.e., up to about 50% by volume. The graphite-metal matrix bearing material manufactured in accordance with the present invention can contain from about 10% to about 50% by volume graphite.

As shown in FIG. 13, a woven graphite fiber mat 76 may be used in place of the non-woven mat 40 in manufacturing the graphite-metal matrix bearing materials of the present invention.

I claim:

1. A method of manufacturing a graphite fiber metal matrix material comprising:
   winding graphite fiber around an outer surface of a removable metal mandrel having a cylindrical outer surface to form a graphite fiber-wrapped mandrel;
   sealing a first open end of a tubular mold with a cap member;
   pouring molten metal into the interior of said tubular mold;

plunging said graphite fiber-wrapped mandrel into said tubular mold to force said molten metal toward a second open tubular mold end within a space defined between an outer surface of the fiber wrapped mandrel and an inner surface of said tubular mold;

solidifying an upper portion of said molten metal to form a molten metal seal between said outer mandrel surface and said inner tube surface and then forcing said fiber-wrapped mandrel further into said tubular mold to increase the hydrostatic pressure on a remaining liquid portion of the molten metal and force the molten metal between said graphite fiber and said mandrel;

solidifying the remainder of said molten metal while said molten metal is in intimate contact with said graphite-fibers to adhere said bearing metal to said inner mold surface and to embed said graphite fiber within said bearing metal;

removing said mandrel from said mold to provide a graphite fiber metal matrix material including a tubular mold having a compliant metal tenaciously adhered to its inner surface, and having graphite fiber embedded within said compliant metal.

2. The method of claim 1 wherein said mold comprises an iron alloy and wherein said compliant metal is selected from the group consisting of lead, tin, copper, nickel, aluminum, silicon, antimony, cadmium and mixtures and alloys thereof.

3. The method of claim 1 wherein said graphite fiber is wound on said mandrel at a predetermined angle with respect to a longitudinal axis of said mandrel.

4. The method of claim 1 wherein said graphite fiber comprises 10–70% by volume of said graphite fiber metal matrix.

5. The method of claim 1 including the step of slicing said graphite fiber metal matrix material transversely to the longitudinal axis of said tubular mold to provide a bearing member having a predetermined width.

6. The method of claim 1 including the step of cooling the molten metal near the second open tube end to solidify the molten metal and form said molten metal seal.

7. The method of claim 1 including wrapping said mandrel with two distinct layers of graphite fiber.

8. The method of claim 1 wherein a first layer of graphite fiber is wrapped at a predetermined angle with respect to a longitudinal axis of said mandrel and the second, overlapping layer of graphite fiber is wrapped at a different angle with respect to the longitudinal axis of the mandrel.

* * * * *